United States Patent
Smith et al.

(10) Patent No.: US 9,843,191 B2
(45) Date of Patent: Dec. 12, 2017

(54) POWER CONVERTER FOR EXECUTING ANTI-ISLANDING PROCEDURES UPON DETECTING AN ISLANDING CONDITION

(75) Inventors: David Smith, Daleville, VA (US); Maozhong Gong, Shanghai (CN)

(73) Assignee: General Electric Company, Schenectady, NY (US)

( * ) Notice: Subject to any disclaimer, the term of this patent is extended or adjusted under 35 U.S.C. 154(b) by 1136 days.

(21) Appl. No.: 13/247,424

(22) Filed: Sep. 28, 2011

(65) Prior Publication Data
US 2013/0076134 A1 Mar. 28, 2013

(51) Int. Cl.
*H02J 3/38* (2006.01)

(52) U.S. Cl.
CPC ......... *H02J 3/383* (2013.01); *H02J 2003/388* (2013.01); *Y02E 10/563* (2013.01); *Y10T 307/50* (2015.04)

(58) Field of Classification Search
CPC ... H02J 2003/388; H02J 3/383; Y10T 307/50; Y02E 10/563; H02M 7/4807; H02M 7/4826
USPC .......... 363/2, 65, 97, 98, 131, 132; 323/205, 323/207, 312, 215
See application file for complete search history.

(56) References Cited

U.S. PATENT DOCUMENTS

| | | | |
|---|---|---|---|
| 5,041,959 A | 8/1991 | Walker | |
| 5,493,485 A | 2/1996 | Okado | |
| 5,578,937 A * | 11/1996 | Haynes | G01R 31/343 318/245 |
| 5,793,250 A * | 8/1998 | Fukushi | H04L 27/2332 329/307 |
| 6,429,546 B1 | 8/2002 | Ropp et al. | |
| 6,810,339 B2 | 10/2004 | Wills | |
| 7,016,793 B2 | 3/2006 | Ye et al. | |
| 7,855,906 B2 | 12/2010 | Klodowski et al. | |
| 2003/0165036 A1* | 9/2003 | Tuladhar | H02J 3/38 361/62 |
| 2006/0004531 A1* | 1/2006 | Ye et al. | 702/60 |
| 2007/0001635 A1* | 1/2007 | Ho | 318/254 |
| 2008/0122293 A1 | 5/2008 | Ohm | |
| 2008/0205096 A1* | 8/2008 | Lai | H02J 3/38 363/40 |
| 2009/0024255 A1* | 1/2009 | Penzenstadler | H02J 3/1842 700/297 |
| 2010/0133904 A1 | 6/2010 | Klodowski et al. | |

(Continued)

FOREIGN PATENT DOCUMENTS

| CN | 1913332 A | 2/2007 |
|---|---|---|
| CN | 102055363 A | 5/2011 |

OTHER PUBLICATIONS

Search Report and Written Opinion from corresponding PCT Application No. PCT/US2012/057729 dated Mar. 7, 2013.

(Continued)

*Primary Examiner* — Fred E Finch, III
*Assistant Examiner* — Demetries A Gibson
(74) *Attorney, Agent, or Firm* — Eversheds Sutherland (US) LLP

(57) ABSTRACT

A power converter including a detection apparatus and method for detecting an islanding condition based on measurements of one or more currents and voltages within the power converter provided to a current regulator to generate a signal that is provided in a positive feedback loop and is indicative of an islanding condition.

14 Claims, 3 Drawing Sheets

(56) References Cited

U.S. PATENT DOCUMENTS

| | | | | |
|---|---|---|---|---|
| 2010/0157634 A1* | 6/2010 | Yu | ............................ | H02J 3/38 |
| | | | | 363/98 |
| 2010/0276996 A1* | 11/2010 | Karipides | ............... | H02J 3/005 |
| | | | | 307/22 |
| 2011/0127833 A1* | 6/2011 | Wu | ........................... | G06F 1/26 |
| | | | | 307/31 |

OTHER PUBLICATIONS

Unofficial English Translation of Chinese Office Action issued in connection with corresponding CN Application No. 201280058505.2 dated Sep. 28, 2015.

* cited by examiner

POWER CONVERTER FOR EXECUTING ANTI-ISLANDING PROCEDURES UPON DETECTING AN ISLANDING CONDITION

FIELD OF THE INVENTION

This invention generally relates to power converters, and in particular to detecting an islanding condition based upon current and voltage measurements within the power converter.

BACKGROUND OF THE INVENTION

Power converters are used to convert power from direct current (DC) power sources to alternating current (AC) power output for use on local loads or for delivery to a power grid. Such power converters are instrumental in applications such as for providing AC power from DC distributed power sources like photovoltaic (PV) cells. With an increased societal focus on anthropogenic environmental degradation, particularly in relation to green house gas (GHG) and certain other emissions, there has been an increased trend towards distributed renewable power generation. For example, in recent years, there has been a steep increase in the number of homes and businesses that have installed roof top solar cell arrays that generate power to power a home or business and also provide excess power to the power grid. Such distributed power generation sources may require power converters that are relatively efficient, inexpensive, reliable, and have a minimal form factor. Conventional power converters typically comprise DC filters, boost converters, AC filters, inverters, and coupling to the power grid.

In distributed generation or point of use generation of power where a local load can receive power either from the distributed generation source or the power grid, the local load can become disconnected from the electric grid and the distributed generation source can continue to power the local load. This condition is referred to as islanding, where the local load and the distributed generation source has been "islanded" or electrically separated from the rest of the power grid.

Islanding a load can lead to a drift in the local frequency and phase between the voltage and current delivered to the local load. Additionally, islanded conditions may pose a hazard to utility workers that may be working on power lines and may not be aware of the existence of islanded and powered live power lines. Therefore, when an islanding condition exists, anti-islanding procedures are implemented to prevent the supply of power from the distributed power source to the local load. Furthermore, Underwriters Laboratory certification (UL1741) requires power converters to provide a mechanism for detecting an islanding condition and implement anti-islanding procedures.

BRIEF SUMMARY OF THE INVENTION

In one embodiment, an inverter controller can include at least one input terminal receiving a direct current (DC) voltage signal, a first alternating current (AC) current signal, a second AC current signal, and an AC voltage signal. The inverter controller can further include a current regulator outputting at least one component signal based in part on the DC voltage signal, the first AC current signal, the second AC current signal, and the AC voltage signal, wherein one or more of the at least one component signal is provided as feedback to change either or both magnitude and frequency of the AC voltage signal, wherein the change is above a corresponding predetermined threshold when an islanding condition exists.

In another embodiment, a method of controlling an inverter can include measuring a direct current (DC) voltage signal, a first alternating current (AC) current signal, a second AC current signal, and an AC voltage signal. The method can also include receiving a nominal VAR reference signal and a DC voltage reference signal and determining at least one component signal based on the DC voltage signal, the first AC current signal, the second AC current signal, the AC voltage signal, the nominal VAR signal, and the DC voltage reference signal. The method can further include determining an inverter control signal based at least in part on the component signal, wherein the at least one component signal is indicative of an islanding condition and resulting in the inverter control signal controlling the power output from the inverter when an islanding condition exists.

In yet another embodiment, a converter system can have at least one power source providing power to a boost converter providing direct current (DC) power, at least one current sensor for measuring a first alternating current (AC) current signal and a second AC current signal, and at least one voltage sensor for measuring a DC voltage signal and an AC voltage signal. The converter system can also have an inverter converting the DC power to alternating current (AC) power based on an inverter control signal and an inverter controller providing the inverter control signal. The inverter controller can include a current regulator outputting at least one component signal based in part on the first DC voltage signal, the first AC current signal, the second AC current signal, and the first AC voltage signal, wherein one or more of the at least one component signal is provided in a positive feedback loop and is indicative of an islanding condition, resulting in the inverter control signal controlling the power output of the inverter when an islanding condition exists.

Other embodiments, features, and aspects of the invention are described in detail herein and are considered a part of the claimed inventions. Other embodiments, features, and aspects can be understood with reference to the following detailed description, accompanying drawings, and claims.

BRIEF DESCRIPTION OF THE FIGURES

Reference will now be made to the accompanying tables and drawings, which are not necessarily drawn to scale, and wherein.

DETAILED DESCRIPTION OF AN EMBODIMENT OF THE INVENTION

Embodiments of the invention are described more fully hereinafter with reference to the accompanying drawings, in which embodiments of the invention are shown. This invention may, however, be embodied in many different forms and should not be construed as limited to the embodiments set forth herein; rather, these embodiments are provided so that this disclosure will be thorough and complete, and will fully convey the scope of the invention to those skilled in the art. Like numbers refer to like elements throughout.

Embodiments of the invention may provide apparatus, systems, and methods for improved detection of an islanding condition. Such improvements may entail, for example, measuring currents and voltages within the power converter and providing the measurements to an inverter controller including a current regulator providing a signal that is used in a positive feedback loop and causes inverter control signals to stop the operation of the inverter if an islanding condition exists. By doing so, the inverter does not provide AC power when an islanding condition exists and anti-islanding is implemented. In one aspect, anti-islanding may be achieved using voltage and current measurements within the power converter itself. In another aspect, anti-islanding may be implemented by the positive feedback loop of the current regulator effecting a change in the frequency, phase, or both frequency and phase of the power output beyond a threshold value to trip the inverter.

Example embodiments of the invention will now be described with reference to the accompanying figures.

Figure 1:
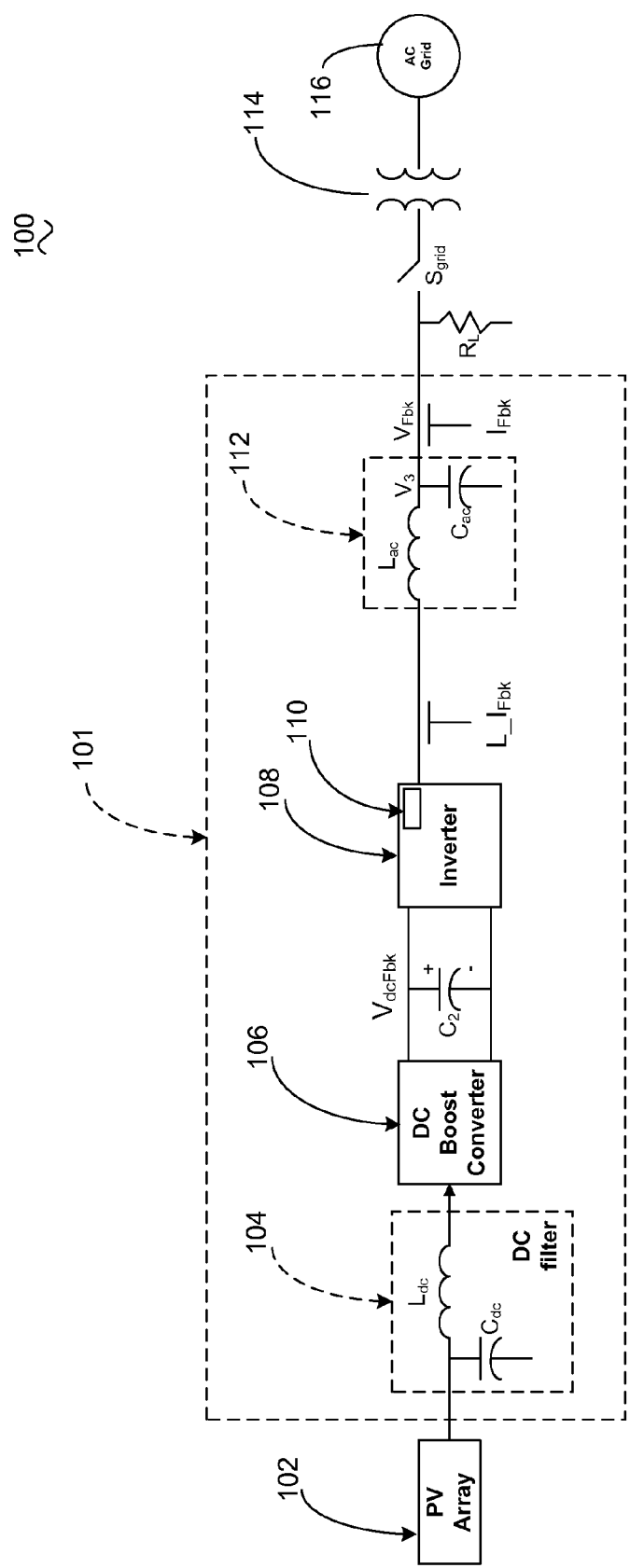
FIG. 1 is a block diagram representation of an example power system including a power converter with an inverter that can be operated according to an embodiment of the invention.

Referring now to FIG. 1, a power system 100 that can be operated according to an embodiment of the invention is described. The power system 100 can include power converter 101, a DC power supply such as a photovoltaic (PV) array 102, a local load $R_L$, a switch $S_{grid}$ and a coupling 114 to a power grid 116. The power converter 101 can include a DC filter 104, electrically connected to and receiving power from the DC power supply 102, that can be further electrically connected to a DC boost converter 106. The DC boost converter 106 can be connected to an inverter 108 that outputs AC power to an AC filter 112 with a capacitor $C_2$ shunted from the power to ground between the DC boost converter 106 and the inverter 108. The inverter 108 may further include an inverter controller 110 or inverter regulator for generating control signals for the operation of the inverter 108 and for controlling the output of the inverter 108. The output of the AC filter 112 can be electrically connected to both a coupling 114 to a power grid 116 via a switch $S_{grid}$, as well as, a local load $R_L$. In an islanded condition of the power converter 101, the output of the AC filter 112 may only be dissipated in the local load $R_L$ and not provided to the power grid 116.

Although, the DC power source is illustrated as a PV array 102, it can, in other embodiments, be any DC power source including, but not limited to, a photovoltaic cell, a fuel cell, and electrolytic cell, or combinations thereof. As a further embodiment, the power source can be non-DC power sources such as from wind harvesting, water harvesting, or solar-thermal (solar concentrator) sources. Additional power sources can include a rectified turbine-generator output where the turbine is driven using any variety of known methods including, but not limited to, burning of fossil fuels and other hydrocarbons, nuclear, hydroelectric, or combinations thereof.

The DC input filter 104 can include an inductor $L_{dc}$ and a capacitor $C_{dc}$. One purpose of the DC input filter 104 can be to prevent current with the chopping frequency of the boost converter 106 to flow to the power source 102 and thereby disrupt the operation of the power source 102. The inductor $L_{dc}$ and capacitor $C_{dc}$ may be appropriately sized to filter out the chopping frequency of the boost converter 106. The DC input filter 104 may also be implemented by any known alternative configuration other than the LC configuration shown.

One purpose of the DC boost converter 106 may be to step up DC voltage. In other words, the DC boost converter 106 may accept power at a certain DC input voltage and output the power at a voltage greater than the DC input voltage.

One purpose of the capacitor $C_2$ may be to filter out any high frequency components at the output of the DC boost converter 106, prior to the signal being provided to the inverter 108. DC power with a boosted voltage is provided to the inverter 108 and the inverter 108 converts the DC power to AC power at its output. The inverter 108 can be controlled by the inverter controller 110 and the inverter controller 110 is described in greater detail in conjunction with FIG. 2 below.

One purpose of the AC filter 112 may be to condition the output power of the inverter 108 to filter out any high frequency components from the inverter 108 output such as the chopping frequency of the inverter 108. The AC filter 112 may include an inductor $L_{ac}$, a capacitor $C_{ac}$, and a resistor $R_{ac}$. The AC Power output of the AC filter 112 may further be consumed by the local load $R_L$, and also provided to the power grid 116.

The switch $S_{grid}$ may selectively disconnect the power from the inverter 108 to the power grid 116. When $S_{grid}$ is closed, AC power from the inverter 108 may be supplied to the power grid 116 via the coupling 114. Therefore, in a non-islanding condition the power converter 101 may be connected to the power grid 116 with an inductive coupling 114 and may therefore see a relatively inductive loading. However, in an islanded condition, the power converter 101 may provide power only to the local load $R_L$, and as a result see a relatively resistive loading. The difference in loading of the power converter 101, in one aspect, can be exploited to discriminate between an islanded and a non-islanded condition.

During operation of the power system 100, various voltage and current measurements may be made and provided to the inverter controller 110. These measurements may be made using various current and voltage sensors as are well known in the art. The measurements may include a DC voltage, DC feedback voltage ($V_{dcFbk}$) measured at the input to the inverter 108, a first AC current, AC line feedback current ($L\_I_{Fbk}$) measured at the output of the inverter 108, an AC voltage, voltage feedback ($V_{Fbk}$) measured at the output of the AC filter, and a second AC current, feedback current ($I_{Fbk}$) also measured at the output of the AC filter. The relative value of these current and voltage measurements may be indicative of whether the power converter 101 is in an islanded state and therefore may be used to monitor for and react to an islanded condition.

Figure 2:
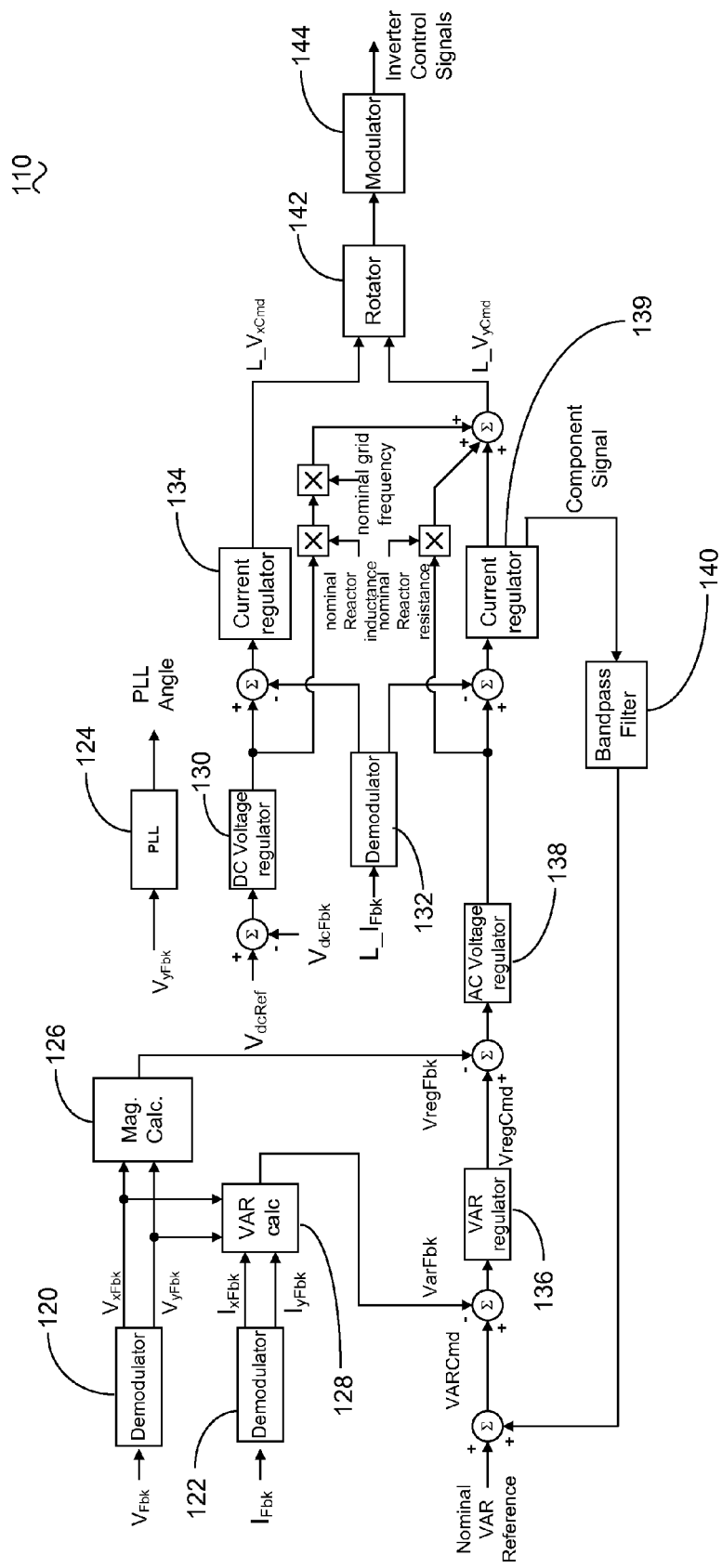
FIG. 2 is a block diagram representation of an example inverter controller according to an embodiment of the invention.

Referring now to FIG. 2, an example inverter controller 110 according to an embodiment of the present invention is described. In one aspect, the inverter controller 110 can receive the voltage and current measurements as described above in a time series and manipulate the measurements to generate inverter control signals. The inverter control signals may be signals to modulate solid state switches (not shown) within the inverter 110. Such signals may further be pulse width modulation (PWM) signals for gating bridges including insulated gate bipolar transistors (IGBTs) within the inverter 110. The generated signals may further cause the inverter 110 to stop functioning or trip when the power converter is in an islanded condition.

The generation of the inverter control signals will now be discussed with continuing reference to FIG. 2. $V_{Fbk}$ and $I_{Fbk}$ can be provided to demodulator blocks 120 and 122, respectively to provide decomposed signals of both measurements $V_{Fbk}$ and $I_{Fbk}$ in a rotating reference frame. The demodulators 120 and 122 may in one aspect accept angular information from a phase lock loop (PLL) 124 to generate a quadrature signal to produce an orthogonal decomposition of the input signals $V_{Fbk}$ and $I_{Fbk}$. The $V_{Fbk}$ measurement may be decomposed in to two orthogonal signals $V_{xFbk}$ and $V_{yFbk}$ and the $I_{Fbk}$ measurement may be decomposed in to two orthogonal signals $I_{xFbk}$ and $I_{yFbk}$.

Signals $V_{xFbk}$ and $V_{yFbk}$ can be provided to a magnitude calculation block 126 to determine the magnitude of $V_{Fbk}$ as $V_{regFbk}$. Additionally, $V_{xFbk}$, $V_{yFbk}$, $I_{xFbk}$, and $I_{yFbk}$ can be provided to a VAR calculation block 128 to determine the cross product of current and voltage as a signal $VAR_{Fbk}$. Signal $V_{yFbk}$ is also provided to the PLL 124 to generate angular information that is used by the demodulators 120 and 122, as well as demodulator 132 and rotator 1424.

Measurement $V_{dcFbk}$ may be subtracted from a DC reference voltage $V_{dcRef}$ that is provided to the inverter controller 110 and the difference can be provided to a DC voltage regulator 130. The measurement $L\_I_{Fbk}$ is provided to the demodulator 132. Demodulator 132 operates similarly to the demodulators 120 and 122, where the input measurement $L\_I_{Fbk}$ can be decomposed into two orthogonal signals $L\_I_{xFbk}$ and $L\_I_{yFbk}$. The $L\_I_{xFbk}$ signal is subtracted from the output of the DC voltage regulator 130 and the difference can be provided to a current regulator 134 that generates a command signal $L\_V_{xCmd}$. The current regulator can be any one of known regulator types including, but not limited to proportional (P), proportional integral (PI), proportional integral derivative (PID), or combinations thereof. In one aspect, $L\_V_{xCmd}$ may be the net current regulator 134 output or the sum of all the component outputs.

Continuing on with FIG. 2, a nominal voltage current reactive (VAR) reference signal may be provided. The nominal VAR reference signal may be provided in example from a utility company to control the amount of reactive power on the power grid 116. The nominal VAR reference may be summed with a signal from a feedback loop to generate a command signal $VAR_{Cmd}$. The $VAR_{Fbk}$ signal may be subtracted from the $VAR_{Cmd}$ signal and provided to a VAR regulator 136 to provide another command signal $V_{regCmd}$. The VAR regulator 136 can regulate how much reactive power is provided to the power grid 116. The $V_{regFbk}$ signal may be subtracted from the $V_{regCmd}$ signal and provided to an AC voltage regulator 138. The signal $L\_I_{yFbk}$ can be subtracted from the output of the AC voltage regulator and provided to a current regulator 139. Like current regulator 134, the current regulator 139 may be of any known type and may generate several component signals, such as an integral signal or a derivative signal. One or more of the component signals of the current regulator 139 may be summed with the product of the output of the DC voltage regulator 130, nominal reactor inductance, and nominal grid frequency and the product of the output of the AC voltage regulator 138 and the nominal reactor resistance to produce a command signal $L\_V_{yCmd}$. The use of regulator outputs, as discussed here, with product signals may be referred to as regulator feed forwards.

The command signals $L\_V_{yCmd}$ and $L\_V_{xCmd}$ in the rotating reference frame may be provided to the rotator 142 to generate a signal combining both $L\_V_{yCmd}$ and $L\_V_{xCmd}$ to generate a command signal $U_{Cmd}$ in the non-rotating reference frame. The command signal $U_{Cmd}$ can then be provided to a modulator 144 to generate inverter control signals. The inverter control signals at the output of the modulator 144 can be, for example, a PWM signal for gating a bridge of the inverter 108.

One or more of the component signals of the current regulator 139 can be provided to a filter, such as a bandpass filter 140 and fed back and summed with the nominal VAR reference to generate the $VAR_{Cmd}$ signal. In effect, a feedback loop can be provided by feeding one or more of the component signals of the current regulator 139 back to the VAR regulator 136 via the bandpass filter 140. In one aspect, the feedback loop may be a positive feedback loop. In one embodiment, the component signal of the current regulator 139 that is fed back in the positive feedback loop may be the integral component.

In one aspect, the feedback loop of the component signal of the current regulator 139 may perturb or accelerate a perturbation in the frequency or magnitude of the output power of the inverter 108 when an islanding condition exists. The deviation in the frequency or magnitude of the inverter output signal beyond a corresponding predetermined threshold may effect the modulator 144 to stop generating inverter control signals or generating inverter control signals that reduce or substantially stop the inverter 108 from outputting power at its output. Therefore, the output power of the inverter can be effectively reduced based on measurements of voltages and currents within the power converter 101. In other embodiments, the feedback loop of the component signal of the current regulator 139 may be fed back through the bandpass filter 140 to either the VAR regulator 136, the AC voltage regulator 138, or the current regulator 139.

It should be noted, that in a multiphase power system 100, the inverter controller 110 may receive measurements for each of the phases of the power system 100 and provide control signals for each of the phases of the power system 100. For example, in a three phase power system, the inverter controller 110 may receive a DC voltage $V_{dcFbk}$, as well as, a first AC current $L\_I_{Fbk\_A}$, $L\_I_{Fbk\_B}$, and $L\_I_{Fbk\_C}$, an AC voltage $V_{Fbk\_A}$, $V_{Fbk\_B}$, and $V_{Fbk\_C}$, and a second AC current $I_{Fbk\_A}$, $I_{Fbk\_B}$, and, $I_{Fbk\_C}$ measurements corresponding to each of the phases A, B, and C of the power system. The inverter controller 110 may further generate intermediary signals corresponding to each of the phases and provide control signals for each of the phases $U_{Cmd\_A}$, $U_{Cmd\_B}$, and $U_{Cmd\_C}$ of the power system.

In other embodiments, the inverter controller 110 as depicted in FIG. 2 may be provided for each phase of the inverter 108. In other words, if the inverter 108 provides three phase power with each phase having a relative phase of 120°, there may be three separate inverter controllers 110 as depicted in FIG. 2, each one controlling each phase of the inverter 108 output.

In further embodiments, the inverter controller 110 as depicted in FIG. 2 may only use a single AC current measurement, along with the DC voltage measurement, and AC voltage measurement to generate inverter control signals. In such a case, the second AC current signal may be estimated rather than measured.

It should also be noted, that the circuit topology of the inverter controller 110 may be modified in various ways in accordance with certain embodiments of the invention. For example, in certain embodiments, one or more circuit components may be eliminated or substituted with equivalent or nearly equivalent circuit elements. Additionally, in other embodiments, other circuit elements may be added to or present in the inverter controller 110.

Figure 3:
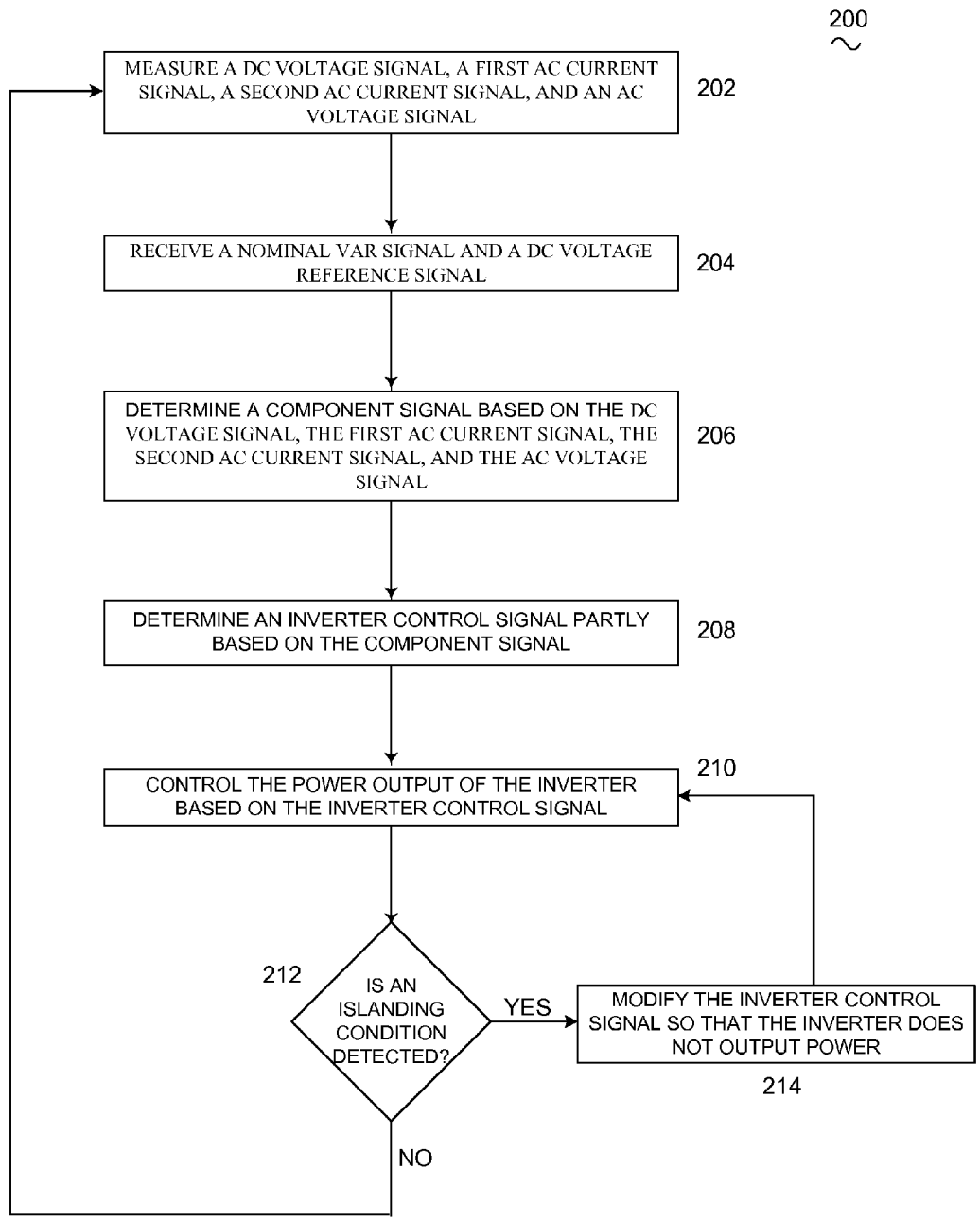
FIG. 3 is a flow diagram of an example method to detect an islanding condition in the power system of FIG. 1 according to an embodiment of the invention.

Referring now to FIG. 3, an example method 200 of providing an inverter control signal is depicted. The method 200 can be implemented using the circuits, apparatus, and systems as disclosed in reference to FIGS. 1 and 2. At block 202, a DC voltage signal, a first AC current signal, a second AC current signal, and an AC voltage signal may be measured. As discussed in reference to FIG. 1, the DC voltage may be $V_{dcFbk}$ measured at the input of the inverter 108, the first AC current signal may be $L\_I_{Fbk}$ measured at the output of the inverter 108, the second AC current signal may be $I_{Fbk}$ measured at the output of the AC filter 112, and the AC voltage signal may be $V_{Fbk}$ measured at the output of the AC filter 112. At block 204, a nominal VAR signal and a DC voltage reference signal may be received. The two signals, Nominal VAR Reference and $V_{dcRef}$ may be received at the inverter controller 110 as illustrated in FIG. 2. At block 206, a component signal may be determined based in part on the measured DC voltage signal, first AC current signal, second AC current signal, and AC voltage signal, as well as, the nominal VAR signal. The determination of the component signal may be according to the mechanism discussed in reference to FIG. 2. At block 208, an inverter control signal is determined based in part on the component signal. The inverter control signal is then provided to the inverter to control the power output of the inverter at block 210.

At block 212, it is determined if an islanding condition exists. If an islanding condition exists, then the inverter control signal may be modified so that the inverter substantially does not output power at block 214 and the resulting control signal is provided to the inverter to control the output power of the inverter at block 210.

In one embodiment, an islanding condition may be detected at the modulator block 144 of the inverter controller 110, for example based on the value of the component signal. In one aspect, the frequency of the inverter 108 output may be perturbed above an upper predetermined threshold value or below a lower predetermined threshold value when an islanding condition exists. Such a divergence from a nominal frequency may be detected at the inverter controller 110, followed by the inverter controller 110 modifying the inverter control signals to substantially reduce or stop outputting power at the output of the inverter 108 in accordance with block 214 of method 200. The deviation in frequency from a nominal value, and in particular beyond either an upper threshold or lower threshold, may be effected by or accelerated by the positive feedback loop of the component signal of the current regulator 139 of the inverter controller 110. In other words, the feedback loop of a component signal, such as the integral component, of the current regulator 139 may force the mechanism of generating an inverter control signal of the inverter controller 110 to push the fundamental frequency of the of the inverter output power beyond a limit and cause the inverter to "trip" or substantially stop outputting power when an islanding condition exists. As an example, if the nominal fundamental frequency is 60 Hz, an upper predetermined threshold value may be about 63 Hz and a lower predetermined threshold frequency may be about 57 Hz.

In another embodiment, the magnitude of the inverter 108 output may be perturbed above an upper predetermined threshold value or below a lower predetermined threshold value when an islanding condition exists. Such a divergence from a nominal magnitude may be detected at the inverter controller 110, followed by the inverter controller 110 modifying the inverter control signals to substantially reduce or stop outputting power at the output of the inverter 108 in accordance with block 214 of method 200. The deviation in magnitude from a nominal value, and in particular beyond either an upper threshold or lower threshold, may be effected by or accelerated by the positive feedback loop of the component signal of the current regulator 139 of the inverter controller 110. In other words, the feedback loop of a component signal, such as the integral component, of the current regulator 139 may force the mechanism of generating an inverter control signal of the inverter controller 110 to push the magnitude of the inverter output power beyond a limit and cause the inverter to "trip" or substantially stop outputting power when an islanding condition exists.

In yet other embodiments, both the frequency of the inverter output and the magnitude may be perturbed above a corresponding upper predetermined threshold value or below a corresponding lower predetermined threshold value. In such a case, either or both frequency or magnitude of the inverter 108 output may in part be used to "trip" the inverter.

It should be noted, that the method 200 may be modified in various ways in accordance with certain embodiments of the invention. For example, one or more operations of method 200 may be eliminated or executed out of order in other embodiments of the invention. Additionally, other operations may be added to method 200 in accordance with other embodiments of the invention.

While certain embodiments of the invention have been described in connection with what is presently considered to be the most practical and various embodiments, it is to be understood that the invention is not to be limited to the disclosed embodiments, but on the contrary, is intended to cover various modifications and equivalent arrangements included within the scope of the appended claims. Although specific terms are employed herein, they are used in a generic and descriptive sense only and not for purposes of limitation.

This written description uses examples to disclose certain embodiments of the invention, including the best mode, and also to enable any person skilled in the art to practice certain embodiments of the invention, including making and using any devices or systems and performing any incorporated methods. The patentable scope of certain embodiments of the invention is defined in the claims, and may include other examples that occur to those skilled in the art. Such other examples are intended to be within the scope of the claims if they have structural elements that do not differ from the literal language of the claims, or if they include equivalent structural elements with insubstantial differences from the literal language of the claims.

The claimed invention is:
1. A power system comprising:
at least one power source providing direct current (DC) power;
a power converter comprising:
an inverter that converts the DC power to alternating current (AC) power;
an AC filter coupled to an output of the inverter;
a voltage sensor coupled to an output of the AC filter;
a current sensor coupled to the output of the AC filter;
an inductive coupler configured to couple the power system to a power grid; and
a switch operable to disconnect the inductive coupler from the power system and retain a connection between the power system and a local load; and,
an inverter controller providing to the inverter, an inverter control signal for modifying an operation of the inverter during an islanding condition, the islanding condition identified by using one or both of the voltage sensor and the current sensor to detect a change from a resistive load to an inductive load, the resistive load corresponding to the local load and the inductive load corresponding to the inductive coupler.

2. The power system of claim 1, the inverter controller further comprising a feedback loop for generating a component signal that is used to generate the inverter control signal for modifying the operation of the inverter during the islanding condition.

3. The power system of claim 2, wherein the feedback loop is configured to receive a nominal VAR reference signal from a utility company associated with the power grid.

4. The power system of claim 2, wherein modifying the operation of the inverter during the islanding condition comprises stopping the inverter from outputting AC power during the islanding condition.

5. The power system of claim 1, the inverter controller further comprising a phase lock loop (PLL) for generating angular information associated with a portion of an AC voltage measurement provided by the voltage sensor coupled to the output of the AC filter.

6. A power system comprising:
   an inductive coupler configured to couple the power system to a power grid;
   a switch operable to disconnect the inductive coupler from the power system and retain a connection between the power system and a local load; and
   an inverter controller comprising:
      a current regulator configured to generate a component signal based in part on a DC voltage measurement at an input of an inverter and a first AC current measurement at an output of the inverter, the component signal provided as feedback in a feedback loop for generating an output signal that is used for generating a command signal; and
      a modulator that generates an inverter control signal based in part on the command signal, the inverter control signal provided to the inverter for modifying an operation of the inverter when an islanding condition exists, the islanding condition identified by using at least the first AC current measurement to detect a change from a resistive load to an inductive load, the resistive load corresponding to the local load, and the inductive load corresponding to the inductive coupler.

7. The power system of claim 6, wherein the inverter control signal controls the inverter to output substantially no output power when the islanding condition exists.

8. The power system of claim 6, wherein the feedback loop is a positive feedback loop comprising a filter.

9. The power system of claim 6, further comprising a phase lock loop (PLL) for generating angular information associated with a portion of an AC voltage measurement from the output of an AC filter coupled to the output of the inverter.

10. The power system of claim 9, further comprising a magnitude calculator for calculating a magnitude of the portion of the AC voltage measurement.

11. A method of controlling an inverter comprising:
    determining in an inverter controller, a component signal based on at least a DC voltage measurement at an input of an inverter and a first AC current measurement at an output of the inverter, the component signal indicative of a change from a resistive load to an inductive load in a power converter system;
    determining an inverter control signal based at least in part on the component signal; and
    using the inverter control signal to stop the inverter from generating AC power during an islanding condition.

12. The method of claim 11, further comprising controlling power output from the inverter when the islanding condition exists.

13. The method of claim 11, wherein the component signal is provided in a positive feedback loop.

14. The method of claim 13, further providing a filter in the positive feedback loop.

* * * * *